(No Model.)
J. B. BENTON & J. A. KEYES.
LIQUID MEASURING AND DELIVERING APPARATUS.
No. 495,657. Patented Apr. 18, 1893.
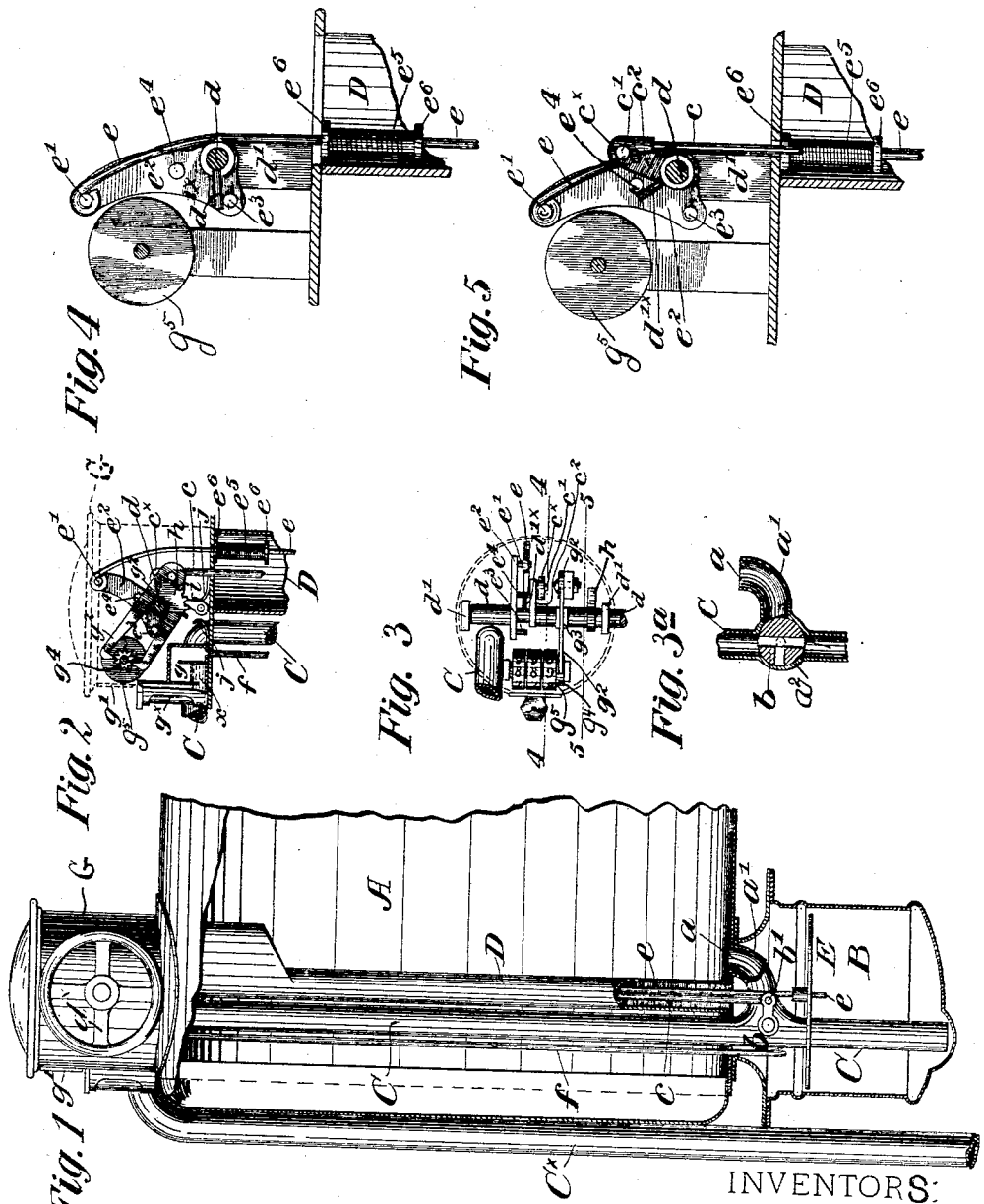
WITNESSES:
INVENTORS:
John B. Benton.
James A. Keyes.
By Henry Connett
Attorney.

UNITED STATES PATENT OFFICE.

JOHN B. BENTON, OF ELIZABETH, NEW JERSEY, AND JAMES A. KEYES, OF NEW YORK, N. Y.

LIQUID MEASURING AND DELIVERING APPARATUS.

SPECIFICATION forming part of Letters Patent No. 495,657, dated April 18, 1893.

Application filed July 25, 1892. Serial No. 441,207. (No model.)

*To all whom it may concern:*

Be it known that we, JOHN B. BENTON, a resident of Elizabeth, Union county, State of New Jersey, and JAMES A. KEYES, a resident of the city, county, and State of New York, citizens of the United States, have invented certain new and useful Improvements in Liquid Measuring and Delivering Apparatus, of which the following is a specification.

Our invention relates to apparatuses for measuring liquids delivered from tanks, and particularly from the class of tanks or reservoirs mounted on wheel vehicles.

We have herein represented our invention as embodied in a device comprising a tank or reservoir, which may be mounted on wheels, adapted for delivering and measuring kerosene oil. It will be understood, however, that it is immaterial whether the reservoir or tank is transportable or not, so far as our invention is concerned, and also immaterial whether it be kerosene or some other liquid which is measured and delivered by the apparatus.

The object of the invention is, in part to provide a device which will accurately measure the amount of liquid delivered; in part to provide a siphon delivery for the liquid measured; in part to provide an indicator to apprise the operator when the measuring vessel is full, and in part to provide a counter for the charges of liquid measured.

The invention will be fully described hereinafter and its novel features carefully defined in the claims.

In the accompanying drawings which serve to illustrate the invention—Figure 1, is a side elevation of the apparatus, showing a part of the tank and the measuring vessel, in section. Fig. 2, is a side elevation of the mechanism for operating the cock, the piston and the counter, detached. In this view the casing inclosing the mechanism is represented in dotted lines. Fig. 3, is a plan view of the mechanism seen in Fig. 2. Fig. $3^a$, is a sectional view of the three-way cock. All of the above views are drawn to the same scale. Fig. 4, is a side elevation on a scale double that of Figs. 1, 2, 3 and $3^a$, of the device for operating the piston; and Fig. 5, is a similar view of the device for operating the valve.

A, represents a part of a tank to contain the oil or other liquid to be measured and delivered. This may be a cylindrical tank of any dimensions and it may be mounted on wheels so as to be transported from point to point, as desired. Secured to the underside of this tank A, is a measuring vessel, B, which is constructed to hold some known quantity of liquid, as five gallons for example; this vessel is so arranged that the liquid from the tank A will flow into it by gravity. The liquid flows out from the tank at an outlet $a$, but its admission to the vessel B, is controlled by a three-way cock, $b$, in an upright pipe, C, the lower end of which is situated near the bottom of the vessel B. A branch pipe $a'$, leads from the outlet $a$ to the cock-chamber $a^2$ in the pipe C.

The cock $b$, is seen in section in Fig. $3^a$. It may be an ordinary three-way cock, arranged to permit the liquid to flow from the tank A to the vessel B, or from vessel B up the pipe C, as desired. The pipe C forms the shorter leg of a siphon, the longer leg, $C^\times$, of which is exterior to the tank A, as here shown, and depends below the bottom of the vessel B. The leg $C^\times$ of the siphon must extend below the bottom of the vessel B, to form a siphon, and it may extend down to any extent desired.

On the stem of the cock $b$, (see Fig. 1,) is a crank arm $b'$, to which is coupled a rod $c$, which extends up through an inclosing tube D, and is coupled at its upper end (see Fig. 5) by a hook, $c^\times$, to a pin $c'$, on a crank or arm $c^2$, on a rock-shaft, $d$, arranged in supports $d'$ at the top of the tank. On this shaft is an operating wheel or crank, $d^\times$, seen in Fig. 1. When the shaft is rotated in such a manner as to draw up the rod $c$, as seen in Fig. 5, the valve $b$ is set to allow the liquid to flow from the tank A to the vessel B. Within the vessel B, is a piston or diaphragm, E, which fits somewhat loosely therein, and this piston is secured to a rod, $e$, which extends up through the tube D, and is coupled at its upper end to a pin, $e'$, on an arm $e^2$, mounted to turn loosely on the rock-shaft $d$. In the arm $e^2$, are set two other pins, $e^3$ and $e^4$, and an arm or stud, $d'^\times$, projects radially from the shaft $d$ and engages between the two pins $e^3$ and $e^4$, on the arm. When the shaft $d$, is rotated toward the left, as the parts are represented in Figs. 1, 2, 4 and 5, the stud $d'$ catches against the pin $e^3$ and carries the arm $e^2$, around with shaft $d$, thus drawing up the rod $e$ and piston E. This is the position of the parts seen in Figs. 1 and 4, the piston E being raised to its greatest elevation in the vessel B, and the valve $b$ open to allow the liquid to flow from the tank A into the vessel B.

When the liquid has risen in the vessel B to very nearly the proper level, it seals the lower end of a tube, $f$, which extends up through the tank A, and enters an S-trap, $g$, arranged, as here shown, adjacent to the rock-shaft $d$. This trap $g$ contains a little oil or other liquid $x$, and has at its outer, upright portion, a glass tube, $g^x$, wherein the liquid $x$, may be seen. After the liquid in vessel B has sealed the lower end of tube $f$, its further rise forces the air up in the tube and causes it to press down upon the inner branch of the U-shaped column of liquid $x$, and thus raise the outer branch of the same, in the glass tube $g^x$. When the operator sees the liquid rise in the glass tube, he is aware that the vessel B, is full, and by means of the crank $d^x$, he rotates the rock-shaft $d$, to the right. The first effect is to close the valve $b$, through the medium of the rod $c$, so as to cut off the flow of liquid from the tank to the vessel B, and open it from the said vessel up through the pipe C. This is the position of the valve as seen in Fig. 3$^a$. The further rotation of the shaft $d$ to the right causes the stud $d'^x$ thereon to engage the pin $e^4$ in the arm $e^2$, and to swing the arm over off the center, when a spring, $e^5$, on the rod $e$, forces the rod down and with it the piston E.

The descent of the piston E in the vessel B forces the liquid therein up the pipe C, over into the pipe $C^x$, and down through the latter pipe until a siphon flow is established which will empty the vessel B.

The rods $c$ and $e$ play in slots in the crown of the tank, the great length of the arm $e^2$, especially, making a long slot necessary. The spring $e^5$, on the rod $e$, is embraced endwise between two washers, $e^6$, the upper one being loose on the rod and bearing against the crown of the tank, and the lower one fixed on the rod and supporting the spring. This spring is not absolutely essential, as the piston E may be forced downward by the rotation of the shaft $d$ with the hand-wheel $d'$, but the spring is an aid, and effects the result automatically.

In order to keep a convenient record or tally of the number of gallons of the liquid sold and thus provide a check on the operator or attendant who delivers the same, it is well to provide a counter to register the numbers of times the vessel B shall have been filled and emptied, and we have shown such a counter herein.

All of the mechanism operated by the rock-shaft $d$ is inclosed within a neat casing G, and within this casing a series of adding wheels, $g^5$, of a well known kind, are rotatively mounted, the numerals on the edges of the wheels appearing in the usual manner at a glazed sight aperture, $g'$, in the casing G. The adding wheels are intermittently rotated by means of a vibrating escapement, $g^2$, the arms of which embrace a cam, $g^3$, on the rock-shaft $d$. When the shaft $d$, is rocked first to the left and then to the right, as described, and to a sufficient extent, the pallets of the escapement act on a toothed escapement wheel, $g^4$, on the first adding wheel of the series and rotate said wheel to the proper extent,—that is, one-tenth of a complete rotation.

In order to compel the operator to rotate the shaft $d$ in both directions to the proper extent to insure the escapement acting efficiently on the escapement wheel, we have provided a device which comprises a cogged segment, $h$, fixed on the shaft $d$, and a vibrating pawl, $i$, pivoted at a point directly below the shaft. This pawl can only engage the teeth of the segment when it stands inclined, owing to its length, and it has two springs, $j$, one at each side. As the parts are represented in Fig. 2, the operator must turn the shaft $d$ to the left until the last tooth of the segment $h$ shall have passed the pawl $i$, when the latter will be free and the spring $j$ at the right, which has been under tension, will throw the pawl over the left and against the spring $j$ at that side. The shaft $d$ may now be turned to the right, but this movement must be kept up until the last tooth of the segment shall have passed the pawl before the movement can be reversed.

As the movement required to operate the valve $b$, is less than that required to operate the counter and the piston E, we provide the rod $c$ with an open hook $c^x$, as described, to engage the pin on the operating arm $c^2$, whereby, when the shaft is turned to the right beyond a certain point the pin leaves the hook and allows the shaft to turn still farther without moving the rod $c$. On again turning the shaft to the left, the pin on the arm will engage the hook on the rod and then operate the latter.

We have shown the apparatus as we prefer to construct it, but some of its features are not absolutely essential. For example, the filling indicator might be dispensed with and the experience of the operator relied on to determine when the vessel B, is full. Or some other known form of indicator may be provided. The bend of the siphon is arranged above the level of the liquid in the full tank, but this is not absolutely essential. The cock $b$ will, by preference, be arranged at the top of the vessel B, and the pipe C will pass through an aperture in the piston or diaphragm E. When the vessel B fills, the air displaced will escape through the tube D, which houses the operating rods $c$ and $e$.

Having thus described our invention, we claim—

1. In a liquid measuring and delivering apparatus, the combination with a tank, a measuring vessel attached thereto and adapted to be filled therefrom by gravity, and a siphon, having its shorter leg extending down into the measuring vessel and the delivery end of its longer leg exterior thereto, of a cock which controls the flow of liquid to the measuring vessel, a piston adapted to be moved up and down in the measuring vessel, and means for operating said cock and piston, substantially as set forth.

2. In a liquid measuring and delivering apparatus, the combination with a tank, a measuring vessel attached to the tank and adapted to be filled therefrom by gravity, and a siphon, having its shorter leg extending down into the measuring vessel and the delivery end of its longer leg below and exterior to said vessel, of a three-way cock controlling the flow of liquid into and out from the measuring vessel, a piston in said measuring vessel, operating rods for said cock and piston, said rods being inclosed in a tubular casing which traverses the tank, the said casing, and a rock-shaft having arms to which said operating rods are coupled, substantially as set forth.

3. In a liquid measuring and delivering apparatus, the combination with the tank, the measuring vessel connected therewith and adapted to be filled therefrom by gravity, and a cock for controlling flow of liquid from the tank to said vessel, of a siphon having its shorter leg extending downward into said vessel to near its bottom, and means substantially as described for displacing a portion of the liquid in the measuring vessel and forcing it into the siphon, whereby a flow is set up in the latter, as set forth.

4. In a liquid measuring and delivering apparatus, the combination with the tank, the measuring vessel, the siphon, the cock controlling the flow of liquid into and out from the measuring vessel, and the piston which displaces a part of the contents of the measuring vessel and sets up a flow in the siphon, of the rods which operate said cock and piston, the rock-shaft provided with arms coupled to said rods, the counter, and mechanism intermediate said counter and said rock-shaft, whereby the rocking movements of said shaft are registered, as set forth.

5. In a liquid measuring apparatus, the combination with the tank, the measuring vessel adapted to be filled by gravity from the tank, and means for controlling the flow of liquid from the tank to the vessel, of the means for indicating when the measuring vessel is full, comprising an S-trap arranged above the measuring vessel and containing liquid, $x$, in two of its branches, and a tube leading from its empty branch down into the measuring vessel and opening into the latter at or near the level of the liquid in the same when the vessel is full, as set forth.

In witness whereof we have hereunto signed our names in the presence of two subscribing witnesses.

JOHN B. BENTON.
JAMES A. KEYES.

Witnesses:
GEO. VAN VLIET,
C. J. APPLETON.